(12) United States Patent
Wang et al.

(10) Patent No.: US 9,696,957 B2
(45) Date of Patent: Jul. 4, 2017

(54) GRAPHIC PROCESSING METHOD, SYSTEM AND SERVER (71) Applicant: TENCENT TECHNOLOGY (SHENZHEN) COMPANY LIMITED, Shenzhen, Guangdong (CN)

(72) Inventors: Li Wang, Guangdong (CN); Hanbing Zhang, Guangdong (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 346 days.

(21) Appl. No.: 14/303,106

(22) Filed: Jun. 12, 2014

(65) Prior Publication Data

US 2014/0292778 A1 Oct. 2, 2014

Related U.S. Application Data (63) Continuation of application No. PCT/CN2014/073787, filed on Mar. 20, 2014.

(30) Foreign Application Priority Data

Mar. 29, 2013 (CN) .......................... 2013 1 0110031

(51) Int. Cl.
*G06F 3/14* (2006.01)
*G06T 11/60* (2006.01)

(52) U.S. Cl.
CPC ................ *G06F 3/14* (2013.01); *G06T 11/60* (2013.01)

(58) Field of Classification Search
None
See application file for complete search history.

(56) References Cited

U.S. PATENT DOCUMENTS 7,926,065 B2 * 4/2011 Meadows .............. H04L 67/02 710/65
2006/0253776 A1 * 11/2006 Ohkawa .............. G06F 17/248 715/204

* cited by examiner

*Primary Examiner* — Ke Xiao
*Assistant Examiner* — Jed-Justin Imperial
(74) *Attorney, Agent, or Firm* — Haug Partners LLP; William S. Frommer (57) ABSTRACT

The present disclosure discloses a graphic processing method, a system and a server, the graphic processing method includes: analyzing a graphic processing template to generate a graphic configuration link when receiving the graphic processing template by a server; receiving at least one graphic information to be processed and processing the at least one graphic information to generate a graphic file by the server according to the graphic configuration link; and sending, by the server, the graphic file to a client device for displaying. The present disclosure can enhance the efficiency of the graphic processing and make the results of the graphic processing more unification and standardization, and reduce the costs of the graphic processing and improve intelligence of the graphic processing.

15 Claims, 9 Drawing Sheets

GRAPHIC PROCESSING METHOD, SYSTEM AND SERVER

CROSS REFERENCE TO RELATED APPLICATIONS

This application is a continuation application of PCT Patent Application No. PCT/CN2014/073787, entitled "GRAPHIC PROCESSING METHOD, SYSTEM AND SERVER", filed on Mar. 20, 2014, which claims priority to Chinese Patent Application No. 201310110031.8, entitled "GRAPHIC PROCESSING METHOD, SYSTEM AND SERVER" and filed on Mar. 29, 2013, both of which are hereby incorporated in their entireties by reference.

FIELD OF THE TECHNICAL

The present disclosure relates to Internet technical field, in particular to graphic processing technical field, and more particularly, to a graphic processing method, a system and a server.

BACKGROUND

Graphic processing is a processing mode designed in general to synthesize images and text. Currently, graphic processing scheme is commonly used to directly provide graphic processing templates to users, so that the users can carry on the graphic processing based on the graphic processing templates. For example, operators of the electronic commerce system provide PSD (Photoshop Document) templates to a shop operator, then the shop operator carries on the graphic processing on shops or commodities based on the PSD templates, etc. However, in the above graphic processing scheme, during the process of graphic processing based on the graphic processing templates, manifestations of template elements in the graphic processing templates are often modified, which may reduce the efficiency of the graphic processing. Moreover, even through different users are provided the same graphic processing templates, but the users may obtain the manifestations of the images with the larger difference, which is lack of uniformity and standardization, so the operators of system (such as the electronic commerce system) need to additionally adjust and modify the images, thus increasing the human cost of the graphic processing and reducing the intelligence of the graphic processing.

SUMMARY

Exemplary embodiments of the present invention provide a graphic processing method, a system and a server, which can enhance the efficiency of the graphic processing and make the results of the graphic processing more unification and standardization, and can reduce the costs of the graphic processing and improve intelligence of the graphic processing.

According to a first aspect of the present embodiment, a graphic processing method is proved, the graphic processing method includes:

analyzing a graphic processing template to generate a graphic configuration link when receiving the graphic processing template by a server;

receiving at least one graphic information to be processed, and processing the at least one graphic information to generate a graphic file by the server according to the graphic configuration link; and sending, by the server, the graphic file to a client device for displaying.

According to a second aspect of the present embodiment, a server is provided, the server includes:

a template analysis module, configured to analyze a graphic processing template to generate a graphic configuration link when receiving the graphic processing template;

a graphic processing module, configured to receive at least one graphic information to be processed, and process the at least one graphic information to generate a graphic file according to the graphic configuration link; and an output module, configured to send the graphic file to a client device for displaying.

According to a third aspect of the present embodiment, a graphic processing system is provided, the graphic processing system includes: at least one client device and the server.

According to a fourth aspect of the present embodiment, a non-transitory computer readable storage medium is provided, the non-transitory computer readable storage medium stores one or more programs for execution by one or more processors of a computer having a display, the one or more programs comprising instructions for:

analyzing a graphic processing template to generate a graphic configuration link when receiving the graphic processing template by a server;

receiving at least one graphic information to be processed, and processing the at least one graphic information to generate a graphic file by the server according to the graphic configuration link; and sending, by the server, the graphic file to a client device for displaying.

In the embodiments of the present invention, the server analyzes the graphic processing template to generate the graphic configuration link, and carries on graphic processing based on the graphic configuration link to generate graphic file, and sends the graphic file to the client device for displaying. Since the graphic processing no longer simply relies on the graphic processing template, but relies on the graphic configuration link with the configuration parameter, so that graphic processing no longer needs to reconfigurate and remodify the manifestations of template elements in the graphic processing templates, which can enhance the efficiency of the graphic processing and make the results of the graphic processing more unification and standardization, and reduce the costs of the graphic processing and improve intelligence of the graphic processing.

BRIEF DESCRIPTION OF THE DRAWINGS

The aforementioned features and advantages of the disclosure as well as additional features and advantages thereof will be more clearly understood hereinafter as a result of a detailed description of preferred embodiment when taken in conjunction with the drawings.

DETAILED DESCRIPTION OF ILLUSTRATED EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

In the embodiments of the present invention, a client device may include, but not limited to: a PC (personal computer), a tablet PC, a mobile phone, a smart phone, a laptop computer and other terminal devices. The client device can also client modules in the terminal device, such as, Web browser client device, etc. A graphic processing method, a system and server are provided in the embodiments of the present invention, can be applied to electronic commerce systems, portal advertising systems and other systems which need graphic processing for system contents, for example: the graphic processing for commodities in the electronic commerce systems; another example: the graphic processing for advertisements in various web portal.

Referring to FIGS. 1-7, a graphic processing method provided in the embodiments of the present invention is described in detail as below.

Figure 1:
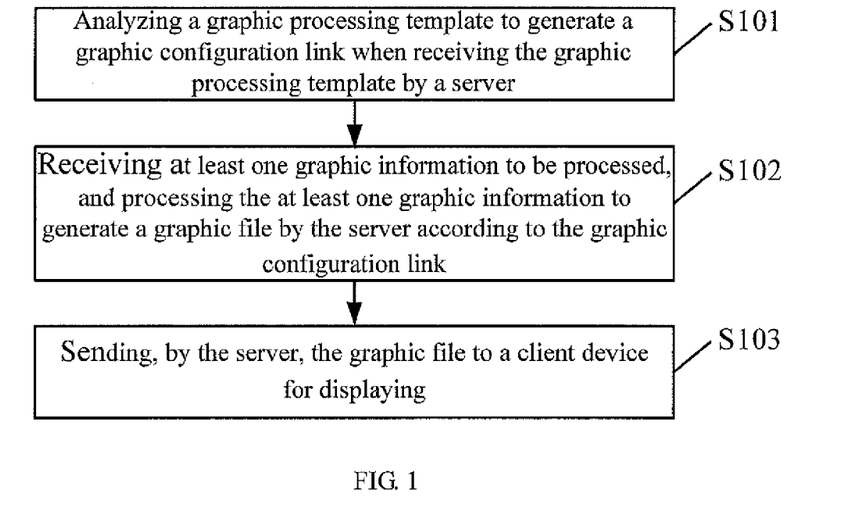
FIG. 1 is a flowchart of a graphic processing method provided in one embodiment of the present invention.

Referring to FIG. 1, FIG. 1 is a flowchart of a graphic processing method provided in one embodiment of the present invention. The graphic processing method may include the following steps S101-S103.

In step S101, analyzing a graphic processing template to generate a graphic configuration link when receiving the graphic processing template by a server.

In the embodiment of the present invention, the graphic processing template refers to a prototype graph which is output after graphic processing as by use of various graphic processing tools, such as, a PSD (the specific image format of Photoshop) template output by the use of Photoshop processing tool, or a PNG (portable network graphic format) template output by the use of Fireworks processing tool, etc. In specific implementation, the designer of the server can provide the graphic processing template according to operational needs, and the graphic processing template can be uploaded to the server by an operator. For example, when promotional activities are organized in the electronic commerce system, the designer can design the graphic processing template which is suitable for the promotional activities according to operational needs, and the graphic processing template is uploaded to the server by the operator. In this step, the server receives the graphic processing template, and analyzes the graphic processing template to generate the graphic configuration link. It should be noted that the graphic processing template includes at least one template element, the template element may include: an image, a text, a background or a subscript. The graphic configuration link includes template parameters of each template element of the at least one template element.

In step S102, receiving at least one graphic information to be processed, and processing the at least one graphic information to generate a graphic file by the server according to the graphic configuration link.

In this embodiment of the present invention, the graphic information may include, but not limited to: pictures and description information of the pictures. For example, in the electronic commerce system, the graphic information can be commodity pictures, and store information, promotional information and other description information of the commodities as shown in the commodity pictures; another example, in portal advertising system, the graphic information may be advertising pictures, and product information and other description information as shown in the advertising pictures; and the like. In this step, the server, according to the graphic configuration link, can process the graphic information to form a picture, for example, in electronic commerce system, graphic information a includes commodity pictures of a commodity A, and shop name information of the commodity A, and the promotional information of the commodity A, and other description information related to the commodity A. In this step, the server can process the graphic information to form a picture according to the graphic configuration link, preferably, the picture is a JPEG (Joint Photographic Experts Group) picture. All contents representation for graphic information a including commodity pictures, and the shop name information of the commodity A, and the promotional information of the commodity A and other description information related to the commodity A are included in the JPEG picture. In this step, it should be understood that the server can process the at least one graphic picture according to the graphic configuration link to generate at least one picture, and the server can combine the at least one picture into a graphic file.

In step S103, sending, by the server, the graphic file to a client device for displaying.

In this embodiment of the present invention, the graphic file can be, but not limited to: an XML (Extensible Markup Language) file. When the server generates the graphic file, then the server stores the graphic file and obtains an address of the graphic file. In this step, the address of the graphic file can pushed onto the client device by the server, the client device can call the address of the graphic file and obtain the graphic file from the server and display the graphic file, then a user of the client device can browse the at least one picture contained in the graphic file.

In the embodiment of the present invention, the server analyzes the graphic processing template to generate the graphic configuration link, and carries on graphic processing based on the graphic configuration link to generate graphic file, and sends the graphic file to the client device for displaying. Since the graphic processing no longer simply relies on the graphic processing template, but bases on the graphic configuration link with the configuration parameter, so that the graphic processing no longer needs to reconfigurate and remodify the manifestations of template elements in the graphic processing templates, which can enhance the efficiency of the graphic processing and make the results of the graphic processing more unification and standardization, and reduce the costs of the graphic processing and improve intelligence of the graphic processing.

Referring to FIGS. 2-7, the steps of the embodiment as shown in FIG. 1 are described in detail as below.

Figure 2:
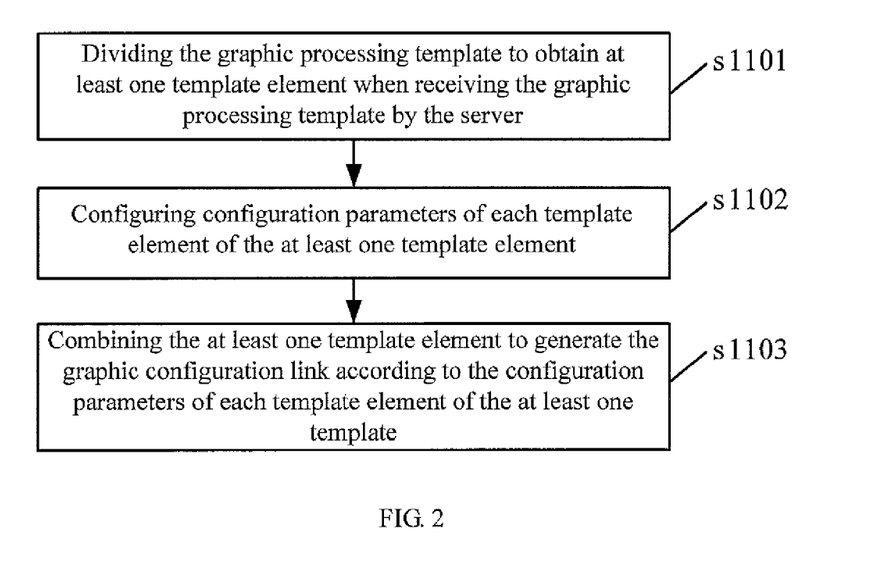
FIG. 2 is a specific flowchart of step S101 as shown in FIG. 1.

Referring to FIG. 2, FIG. 2 is a specific flowchart of the step S101 as shown in FIG. 1. The step S101 may include the following steps s1101 to s1103.

In step s1101, dividing the graphic processing template to obtain at least one template element when receiving the graphic processing template by the server.

Figure 3A:
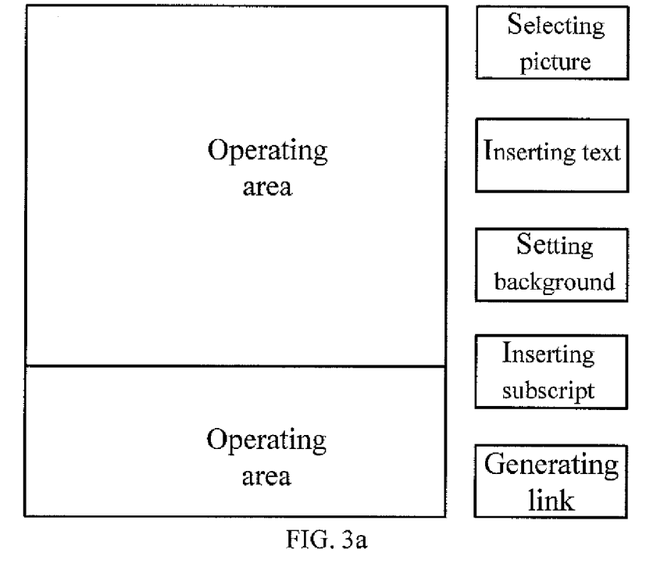
FIG. 3a is an analytic schematic diagram of a graphic processing template provided in one embodiment of the present invention.
Figure 3B:
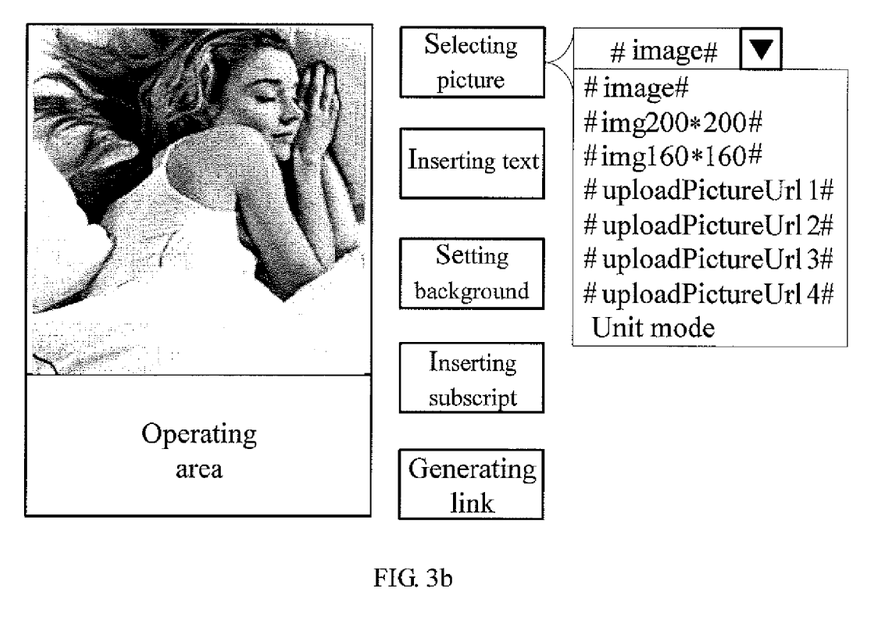
FIG. 3b is a parameter configuration diagram of a template element provided in one embodiment of present invention.
Figure 3C:
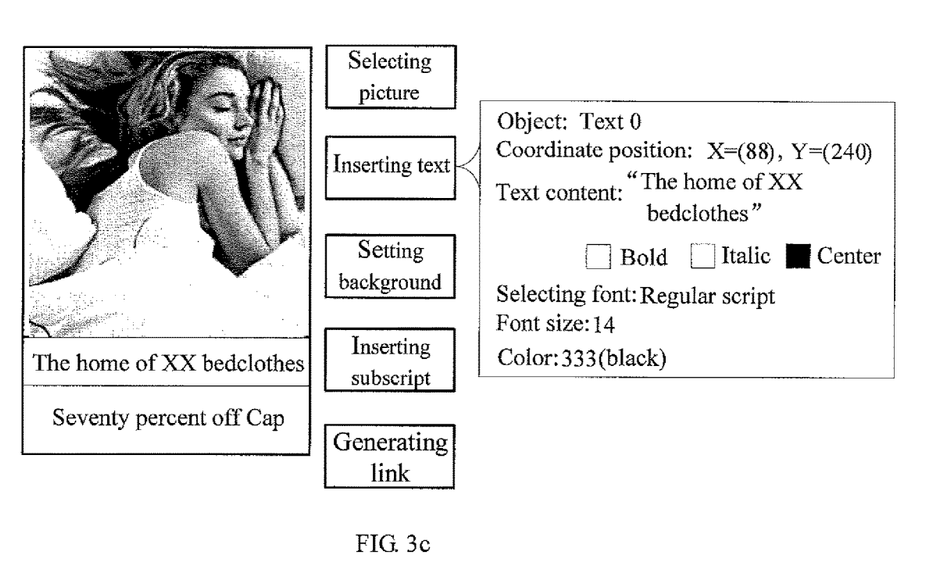
FIG. 3c is a parameter configuration diagram of a template element provided in another embodiment of present invention.
Figure 3D:
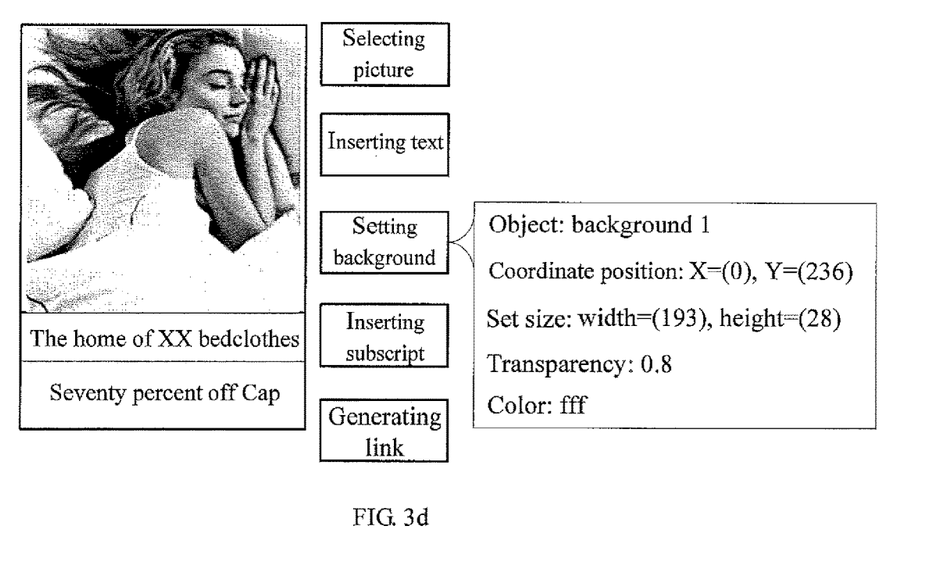
FIG. 3d is a parameter configuration diagram of a template element provided in yet another embodiment of present invention.
Figure 3E:
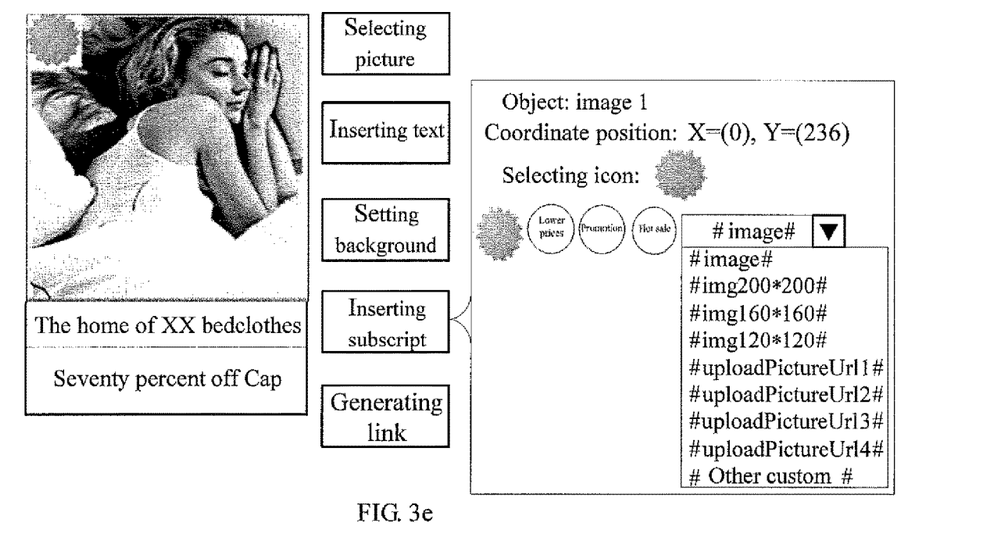
FIG. 3e is a parameter configuration diagram of a template element provided in yet another embodiment of present invention.

In the embodiment of the present invention, the template element may include: an image, a text, a background or a subscript. In this step, when the server receives the graphic processing template, the server can analyze the graphic processing template and divide the graphic processing template into at least one template element, and further digitize each template element. Referring to FIG. 3a, FIG. 3a is an analytic schematic diagram of a graphic processing template provided in one embodiment of the present invention. As shown in FIG. 3a, the PSD template can be divided into four template elements including: an image, a text, a background or a subscript, which respectively correspond to "selecting picture," "inserting text," "setting background," and "inserting subscript" in FIG. 3a.

In step s1102, configuring configuration parameters of each template element of the at least one template element.

As described above, since the graphic processing template is divided into at least one single template element in the step s1101, in this step s1102, the server can carry on parameter configuration for each template processing element to obtain the configuration parameters of each template element. Also referring to FIGS. 3b-3e, FIGS. 3b-3e are parameter configuration diagrams of the template element provided in the embodiments of present invention. As shown in FIGS. 3b-3e, the operator of the server carries out parameter configuration for the graphic template element by clicking the "selecting picture" on FIG. 3b, and carries out parameter configuration for the graphic template element by clicking the "inserting text" on FIG. 3c, and carries out parameter configuration for the graphic template element by clicking the "setting background" on FIG. 3d, and carries out parameter configuration for the graphic template element by clicking the "inserting subscript" on FIG. 3e.

In step s1103, combining the at least one template element to generate the graphic configuration link according to the configuration parameters of each template element of the at least one template, wherein, the graphic configuration link contains the configuration parameters of each template element of the at least one template.

Figure 3F:
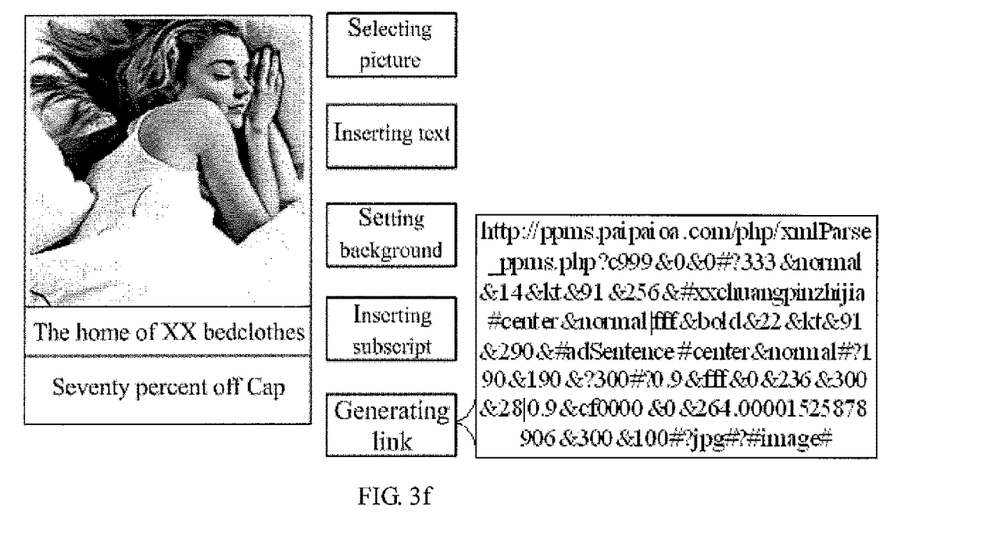
FIG. 3f is a generation diagram of a graphic configuration link provided in one embodiment of the present invention.

Referring to FIG. 3f, FIG. 3f is a generation diagram of a graphic configuration link provided in one embodiment of the present invention. After the completion of the configuration parameter of each template element, at least one template element is combined by clicking "generating link", to generate a graphic configuration link as shown in FIG. 3f.

In the embodiment of the invention, the graphic configuration link contains the configuration parameters of each template element of the at least one template; for example, referring to FIG. 3f, in the generated graphic configuration link, "c999&0&0" is a subscript configuration parameter, which indicates that the subscript does not exist currently; "fff&bold&0&kt&0&0" is a text configuration parameter, which indicates that the text does not exist currently; "190&?300" is a size parameter of the picture, etc.

It should be noted that, in this embodiment of the present invention, the graphic processing template is divided into at least one template element, and each template element is implemented the parameter configuration, which can make the manifestation of each template element unified and standardized; moreover, the graphic configuration link is configured to carry the configuration parameters of each template element, so that the graphic information is processed by the server according to combined graphic configuration link to obtain pictures, and the pictures can be standardized.

In the embodiment of the present invention, the step S102 in FIG. 1 may include two possible embodiments as blow.

Figure 4:
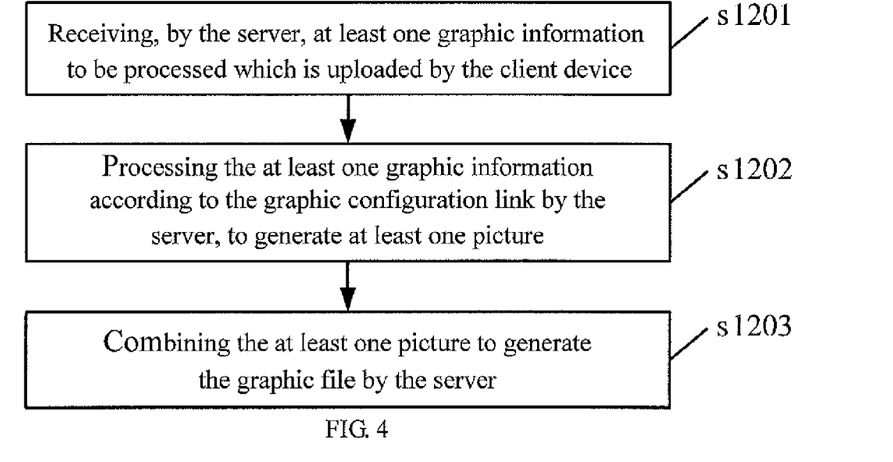
FIG. 4 is a specific flowchart of step S102 as shown in FIG. 1.

In a first possible embodiment, referring to FIG. 4, FIG. 4 is a specific flowchart of step S102 as shown in FIG. 1, and the step S102 may include the following steps s1201 to s1203.

In step s1201, receiving, by the server, at least one graphic information to be processed which is uploaded by the client device.

In the embodiment of the present invention, the graphic information includes: pictures and description information of the pictures. For example, in the electronic commerce system, the graphic information can be commodity pictures, and the store information, and the promotional information and other description information of the commodities as shown in the commodity pictures. When the promotional activities are organized in the electronic commerce system, the operator of the server can notify the shop operator to participate in the promotional activities in the electronic commerce system, and accept registrations of the shop operator. The shop operator who registers successfully can upload the graphic information including the commodity pictures, and the store information, and the promotional information and other description information of the commodities as shown in the commodity pictures to the server through the client device. In this step, the server receives the at least one picture information uploaded by the client device.

In step s1202, processing the at least one graphic information according to the graphic configuration link by the server, to generate at least one picture.

Figure 5:
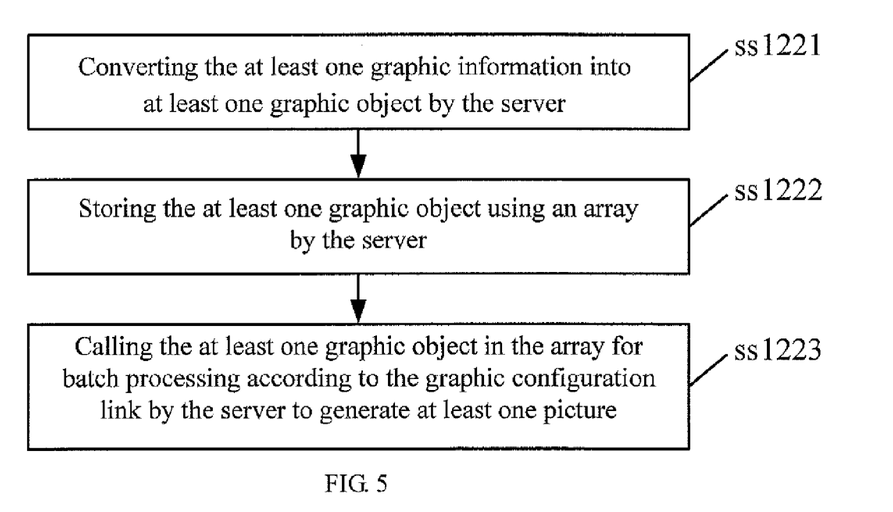
FIG. 5 is a specific flowchart of step s1202 as shown in FIG. 4.

In the embodiment of the present invention, the graphic information corresponds to the at least one picture. In this step, the server processes any one graphic information of the at least one graphic information according to the graphic configuration link, therefore generating at least one picture. In this step, the server can call graphic analysis tools (e.g., iPicture system tools) to process the graphic information as shown in FIG. 5 in detail. FIG. 5 is a specific flowchart of step s1202 as shown in FIG. 4; the step s1202 may include steps ss1221 to s1223 as below.

In step ss1221, converting the at least one graphic information into at least one graphic object by the server.

In the embodiment of the present invention, the graphic information corresponds to the at least one picture. In this step, the server can process the at least one graphic information into an XML file which here is named as a first XML file. The server transfers address of the first XML file to the iPicture system tool, and the iPicture system tool can obtain the first XML file by use of an AJAX (Asynchronous JavaScript and XML) combined with a PHP (Hypertext Preprocessor), and the first XML file is analyzed by use of simple XML plug-in to convert the at least one graphic information of the first XML file into the at least one graphic object. It should be noted that if the first XML file is stored in the server, in this step, the iPicture system tool can directly call and obtain the first XML file. If the first XML file is stored in other database by the server, in this step, the iPicture system tool first needs to download the first XML file from the database to the server through a proxy server, and obtains the first XML file from the server.

In step ss1222, storing the at least one graphic object using an array by the server.

In step ss1223, calling the at least one graphic object in the array for batch processing according to the graphic configuration link by the server to generate at least one picture.

In this step, the server transfers the graphic configuration link to the iPicture system tool, and the iPicture system tool can call the at least one graphic object in the array for batch processing to generate the at least one picture. Preferably, each picture is a JPEG picture. The iPicture system tool obtains the at least one JPEG picture, and then transmits the at least one picture to the server.

In step s1203, combining the at least one picture to generate the graphic file by the server.

In this step, the server can combine the at least one picture (preferably JPEG picture) to generate the graphic file and store the graphic file, that is, the at least one picture is arranged and stored together in the form of stack, time series, size, name or type, to form the graphic file by the server. The graphic file can be an XML file which here is named as a second XML file. The server stores the second XML file and obtains an address of the second XML file after generating the second XML file.

Figure 6:
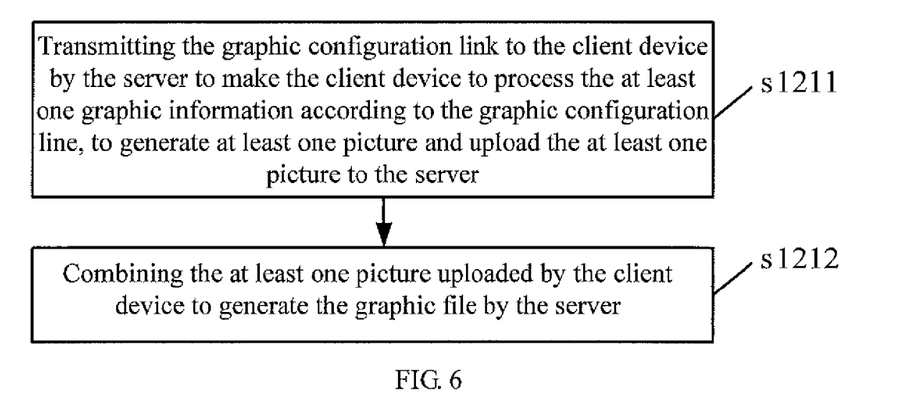
FIG. 6 is a specific flowchart of step S102 as shown in FIG. 1.

In a second possible embodiment, referring to FIG. 6, FIG. 6 is a specific flowchart of step S102 as shown in FIG. 1; the step S102 may include steps s1211 to s1212 as below.

In step s1211, transmitting the graphic configuration link to the client device by the server to make the client device to process the at least one graphic information according to the graphic configuration link, to generate at least one picture and upload the picture to the server.

Wherein, the graphic information includes: pictures and the description information of the pictures; such as, in the electronic commerce system, the graphic information can be commodity pictures, and the store information, and the promotional information and other description information of the commodities as shown in the commodity pictures. When the promotional activities are organized in the electronic commerce system, the operator of the server can notify the shop operator to participate in the promotional activities in the electronic commerce system. In this step, the graphic configuration link is transmitted to the client device of the shop operator through the server by the operator of the server, and then is displayed on the client device. The shop operator can access to the graphic processing interface of the iPicture system tool of the server by clicking the graphic configuration link to process the at least one graphic information.

Figure 7:
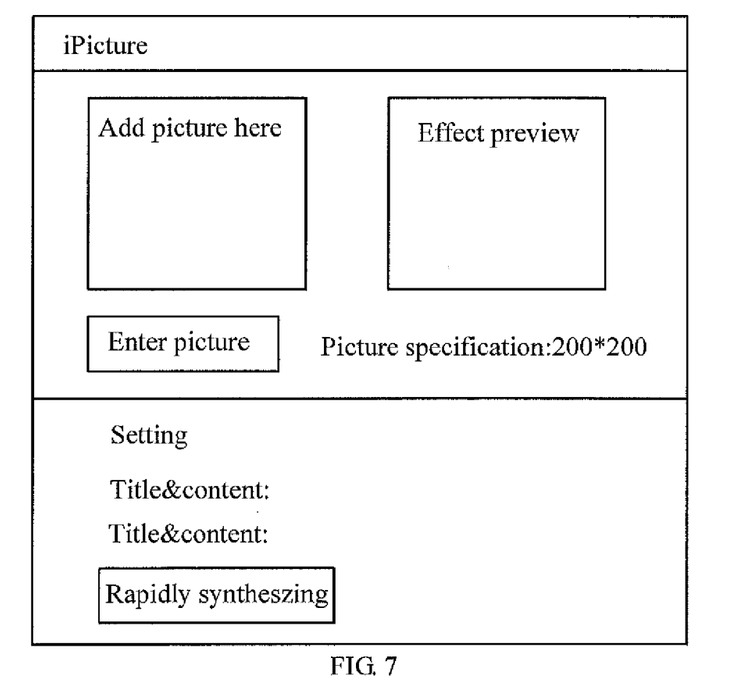
FIG. 7 is a schematic diagram of a graphic processing interface provided in one embodiment of the present invention.

Referring to FIG. 7, FIG. 7 is a schematic diagram of a graphic processing interface provided in one embodiment of the present invention. As shown in FIG. 7, the shop operator can, in turn, insert the pictures and the description information of the pictures included in the graphic information to be processed in the graphic processing interface, and combine the pictures and the description information of the pictures into a picture. Preferably, the picture is a JPEG picture. The shop operator may upload the combined picture to the server through the client device to sign up and participate in the promotional activities.

In step s1212, combining the at least one picture uploaded by the client device to generate the graphic file by the server.

In this step, the at least one picture (preferably the JPEG picture) uploaded by the client device is combined by the server to generate the graphic file and then the graphic file is stored. The graphic file can be an XML file which here is named as a second XML file. The server stores the second XML file and obtains address of the second XML file after generating the second XML file.

In summary, in the embodiment of the present invention, the server analyzes the graphic processing template to generate the graphic configuration link, and carries on graphic processing based on the graphic configuration link to generate graphic file, and sends the graphic file to the client device for displaying. Since the graphic processing no longer simply relies on the graphic processing template, but relies on the graphic configuration link with the configuration parameter, so that graphic processing no longer needs to reconfigurate and remodify the manifestations of template elements in the graphic processing templates, which can enhance the efficiency of the graphic processing and make the results of the graphic processing more unification and standardization, and reduce the costs of the graphic processing and improve intelligence of the graphic processing.

Referring to FIGS. 8-12, the server provided in embodiments of the present invention is described in detail as blow. It should be noted that the server can be applied to the above method.

Figure 8:
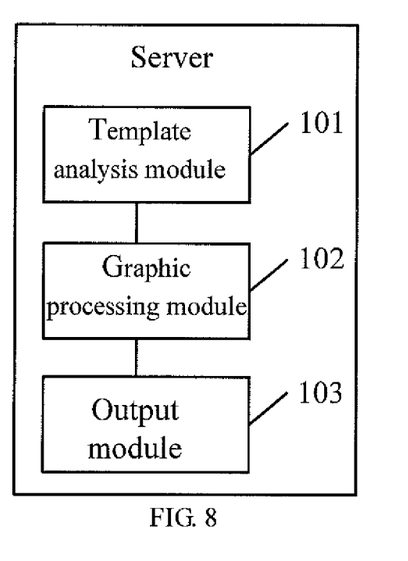
FIG. 8 is a block diagram of a server provided in one embodiment of the present invention.

Referring to FIG. 8, FIG. 8 is a block diagram of a server provided in one embodiment of the present invention. The server may include: a template analysis module 101, a graphic processing module 102 and an output module 103.

The template analysis module 101, is configured to analyze a graphic processing template to generate a graphic configuration link when receiving the graphic processing template.

In the embodiment of the present invention, the graphic processing template is a prototype graph which is output after graphic processing as need by use of various graphic processing tools, such as, a PSD (Photoshop Document) template output by the use of Photoshop processing tool, or a PNG (portable network graphic format) template output by the use of Fireworks processing tool, etc. In specific implementation, the designer of the server can provide the graphic processing template according to operational needs, and the graphic processing template can be uploaded to the server by operator. For example, when promotional activities are organized in the electronic commerce system, the designer can design the graphic processing template which is suitable for the promotional activities according to operational needs, and the graphic processing template is uploaded to the server by the operator. The template analysis module 101 receives the graphic processing template, and analyzes the graphic processing template to generate the graphic configuration link. It should be noted that the graphic processing template includes at least one template element, the template element may include: an image, a text, a background or a subscript. The graphic configuration link includes template parameters of each template element of the at least one template element.

The graphic processing module 102, is configured to process at least one graphic information to generate a graphic file according to the graphic configuration link.

In this embodiment of the present invention, the graphic information may include, but not limited to: pictures and the description information of the pictures. For example, in the electronic commerce system, the graphic information can be commodity pictures, and store information, promotional information and other description information of the commodities as shown in the commodity pictures; another example, in portal advertising system, the graphic information may be advertising pictures, and product information and other description information as shown in the advertising pictures; and the like. The graphic processing module 102, according to the graphic configuration link, can process the graphic information to form a picture, for example, in electronic commerce system, graphic information a includes commodity pictures of a commodity A, and shop name information of the commodity A and the promotional information of the commodity A and other description information related to the commodity A. The graphic processing module 102 can process the graphic information a to form a picture according to the graphic configuration link, preferably, the picture is a JPEG picture. All contents representation for graphic information a including commodity pictures, and the shop name information of the commodity A and the promotional information of the commodity A and other description information related to the commodity A are included in the JPEG picture. It should be understood that the graphic processing module 102 can process the at least one graphic picture according to the graphic configuration link to generate at least one picture, and the graphic processing module 102 can combine the at least one picture into a graphic file.

The output module 103, is configured to send the graphic file to the client device for displaying.

In this embodiment of the present invention, the graphic file can be, but not limited to: an XML file. When the graphic processing module 102 generates the graphic file, then the server stores the graphic file and obtains an address of the graphic file. The output module 103 can push the address of the graphic file onto the client device by the server, the client device can call the address of the graphic file and obtain the graphic file from the server and display the graphic file, then a user of the client device can browse the at least one picture contained in the graphic file.

In the embodiment of the present invention, the server analyzes the graphic processing template to generate the graphic configuration link, and carries on graphic processing based on the graphic configuration link to generate graphic file, and sends the graphic file to the client device for displaying. Since the graphic processing no longer simply relies on the graphic processing template, but relies on the graphic configuration link with the configuration parameter, so that the graphic processing no longer needs to reconfigurate and remodify the manifestations of template elements in the graphic processing templates, which can enhance the efficiency of the graphic processing and make the results of the graphic processing more unification and standardization, and reduce the costs of the graphic processing and improve intelligence of the graphic processing.

Referring to FIGS. 9-12, each module of the embodiment in FIG. 8 is described in detail as below.

Figure 9:
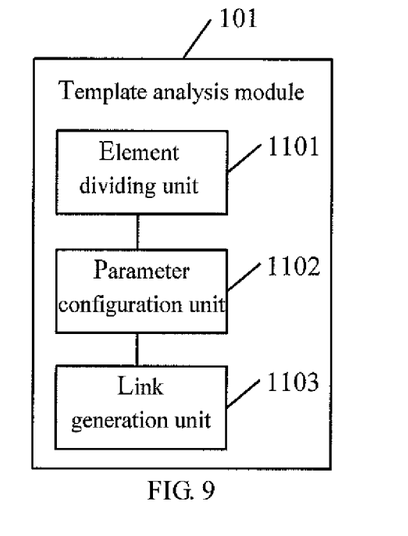
FIG. 9 is a block diagram of a template analysis module provided in one embodiment of the present invention.

Referring to FIG. 9, FIG. 9 is a block diagram of the template analysis module provided in one embodiment of the present invention. The template analysis module 101 may include: an element dividing unit 1101, a parameter configuration unit 1102 and link generation unit 1103.

The element dividing unit 1101, is configured to divide the graphic processing template to obtain at least one template element when receiving the graphic processing template.

In the embodiment of the present invention, the template element may include: an image, a text, a background or a subscript. When the dividing unit 1101 receives the graphic processing template, the dividing unit 1101 can analyze the graphic processing template and divide the graphic processing template into at least one template element, and further digitize each template element.

The parameter configuration unit 1102, is configured to configure configuration parameters of each template element of the at least one template element.

Since the graphic processing template is divided into at least one single template element by the element dividing unit 1101, then the parameter configuration unit 1102 can carry on parameter configuration for each template processing element to obtain the configuration parameters of each template element.

The link generation unit 1103, is configured to combine the at least one template element to generate the graphic configuration link according to the configuration parameters of each template element of the at least one template.

After the completion of the configuration parameter of each template element, at least one template element is combined by the link generation unit 1103 to generate the graphic configuration link. Wherein, the graphic configuration link includes the configuration parameters of each template element of the at least one template.

It should be noted that, in this embodiment of the present invention, the graphic processing template is divided into at least one template element, and each template element is implemented the parameter configuration, which can make the manifestation of each template element unified and standardized; moreover, the graphic configuration link is configured to carry the configuration parameters of each template element, so that the graphic information is processed by the server according to combined graphic configuration link to obtain pictures, and the pictures can be standardized.

In the embodiment of the present invention, the graphic processing module 102 in FIG. 8 may include two possible embodiments as blow.

Figure 10:
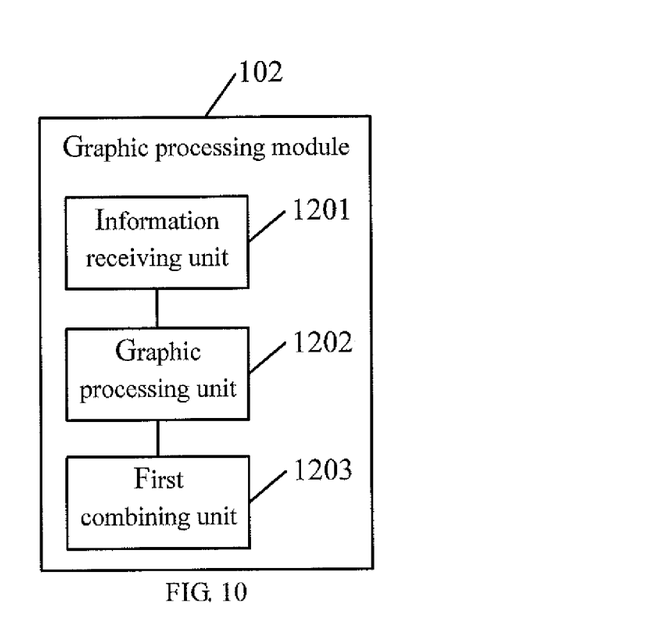
FIG. 10 is a block diagram of a graphic processing module provided in one embodiment of the present invention.

In a first possible embodiment, referring to FIG. 10, FIG. 10 is a block diagram of a graphic processing module provided in one embodiment of the present invention. The graphic processing module 102 may include: an information receiving unit 1201, a graphic processing unit 1202 and a first combining unit 1203.

The information receiving unit 1201, is configured to receive the at least one graphic information to be processed which is uploaded by the client device.

In the embodiment of the present invention, the graphic information includes: pictures and the description information of the pictures. For example, in the electronic commerce system, the graphic information can be commodity pictures, and the store information and the promotional information and other description information of the commodities as shown in the commodity pictures. When the promotional activities are organized in the electronic commerce system, the operator of the server can notify the shop operator to participate in the promotional activities in the electronic commerce system, and accept registrations of the shop operator. The shop operator who registers successfully can upload the graphic information including the commodity pictures, and the store information, the promotional information and other description information of the commodities shown in the commodity pictures to the server through the client device. The information receiving unit 1201 receives the at least one picture information uploaded by the client device.

The graphic processing unit 1202, is configured to process the at least one graphic information according to the graphic configuration link, to generate at least one picture.

In the embodiment of the present invention, the graphic information corresponds to the pictures. The graphic processing unit 1202 processes any one graphic information of the at least one graphic information to be processed according to the graphic configuration link to further generate a picture. In the specific implementation, the graphic processing unit 1202 can call graphic analysis tools (such as, iPicture system tool) to process the graphic information. The specific block configuration of the graphic processing unit 1202 is described in FIG. 11.

Figure 11:
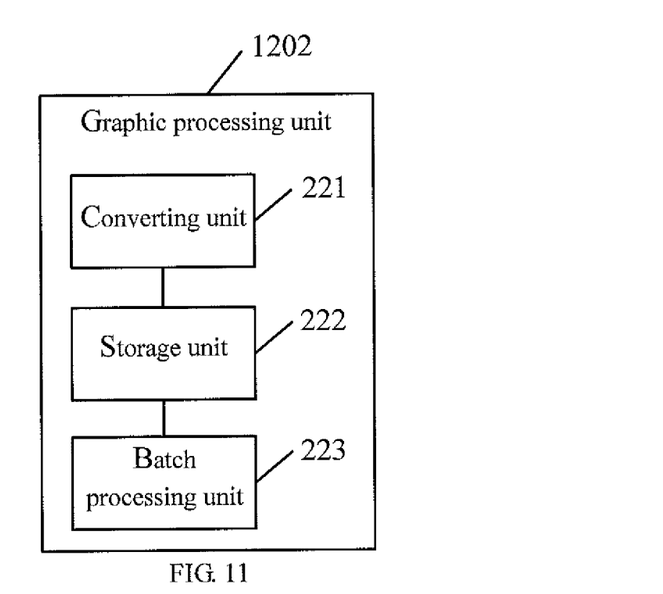
FIG. 11 is a block diagram of a graphic processing unit as shown in FIG. 10.

Referring to FIG. 11, FIG. 11 is a block diagram of the graphic processing unit as shown in FIG. 10. The graphic processing unit 1202 may include: a converting unit 221, a storage unit 222 and batch processing unit 223.

The converting unit 221, is configured to convert the at least one graphic information into at least one graphic object.

In the embodiment of the present invention, the graphic information corresponds to the pictures. The server can process the at least one graphic information into an XML file which here is named as a first XML file. The converting unit 221 transfers address of the first XML file to the iPicture system tool, and the iPicture system tool can obtain the first XML file by use of an AJAX combined with a PHP, and the first XML file is analyzed by use of simple XML plug-in to convert the at least one graphic information of the first XML file into the at least one graphic object. It should be noted that if the first XML file is stored in the server, in this step, the iPicture system tool can directly call and obtain the first XML file. If the first XML file is stored in other database by the server, in this step, the iPicture system tool first needs to download the first XML file from the database to the server through a proxy server, and obtains the first XML file from the server.

The storage unit 222, is configured to store the at least one graphic object using array.

The batch processing unit 223, is configured to call at least one graphic object in the array for batch processing according to the graphic configuration link to generate at least one picture.

The batch processing unit 223 transfers the graphic configuration link to the iPicture system tool, and the iPicture system tool can call the at least one graphic object in the array for batch processing to generate the at least one picture. Preferably, the picture is a JPEG picture. The iPicture system tool obtains the at least one JPEG picture, and then transmits the at least one picture to the batch processing unit 223.

The first combining unit 1203, is configured to combine the at least one picture to generate the graphic file.

The first combining unit 1203 can combine the at least one picture (preferably JPEG picture) to generate the graphic file and store the graphic file. The graphic file can be an XML file which here is named as a second XML file. When the first combining unit 1203 generates the second XML file, the server stores the second XML file and obtains an address of the second XML file.

Figure 12:
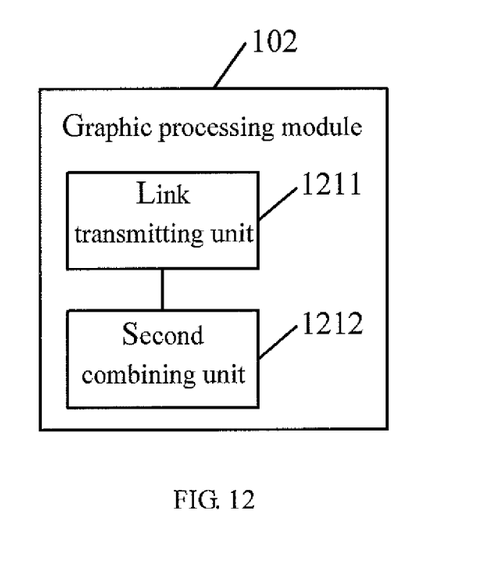
FIG. 12 is a block diagram of a graphic processing module provided in another embodiment of the present invention.

In a second possible embodiment, referring to FIG. 12, FIG. 12 is a block diagram of the graphic processing module provided in another embodiment of the present invention. The graphic processing module 102 further includes: a link transmitting unit 1211 and a second combining unit 1212.

The link transmitting unit 1211, is configured to transmit the graphic configuration link to the client device to make the client device to process the at least one graphic information according to the graphic configuration link, to generate at least one picture and upload the picture to the server.

Wherein, the graphic information includes: pictures and the description information of the pictures; such as, in the electronic commerce system, the graphic information can be commodity pictures, and the store information, and the promotional information and other description information of the commodities as shown in the commodity pictures. When the promotional activities are organized in the electronic commerce system, the operator of the server can notify the shop operator to participate in the promotional activities in the electronic commerce system. The graphic configuration link is transmitted to the client device of the shop operator by the link transmitting unit 1211, and then is displayed on the client device. The shop operator can access to the graphic processing interface of the iPicture system tool of the server by clicking the graphic configuration link, to process the at least one graphic information. The pictures and the description information of the pictures included in the graphic information are combined into a picture. Preferably, the picture is a JPEG picture. The shop operator may upload the combined picture to the server through the client device to sign up and participate in the promotional activities.

The second combining unit 1212, is configured to combine the at least one picture uploaded by the client device to generate the graphic file.

The at least one picture (preferably JPEG picture) uploaded by the client device is combined by the second combining unit 1212 to generate the graphic file and then the graphic file is stored. The graphic file can be an XML file which here is named as a second XML file. The second combining unit 12121 stores the second XML file and obtains address of the second XML file after generating the second XML file.

It should be noted that the structures and the functions of the server shown in FIGS. 8-12 can be implemented and realized by means of the method provided in the embodiments in FIGS. 1-7, and specific implementation process can refer to the relevant descriptions of the method provided in the embodiments.

In summary, in the embodiment of the present invention, the server analyzes the graphic processing template to generate the graphic configuration link, and carries on graphic processing based on the graphic configuration link to generate graphic file, and sends the graphic file to the client device for displaying. Since the graphic processing no longer simply relies on the graphic processing template, but relies on the graphic configuration link with the configuration parameter, so that graphic processing no longer needs to reconfigurate and remodify the manifestations of template elements in the graphic processing templates, which can enhance the efficiency of the graphic processing and make the results of the graphic processing more unification and standardization, and reduce the costs of the graphic processing and improve intelligence of the graphic processing.

A graphic processing system is provided in one embodiment of the present invention, the graphic processing system includes the at least one client device and the server as shown in FIGS. 8-12. The structures and the functions of the server can refer to the relevant descriptions of the embodiments in FIGS. 8-12, which here are not repeated. It should be noted that the graphic processing system in the embodiment can be applied to the graphic processing method.

Based on the above descriptions, in the embodiment of the present invention, the server analyzes the graphic processing template to generate the graphic configuration link, and carries on graphic processing based on the graphic configuration link to generate graphic file, and sends the graphic file to the client device for displaying. Since the graphic processing no longer simply relies on the graphic processing template, but relies on the graphic configuration link with the configuration parameter, so that graphic processing no longer needs to reconfigurate and remodify the manifestations of template elements in the graphic processing templates, which can enhance the efficiency of the graphic processing and make the results of the graphic processing more unification and standardization, and reduce the costs of the graphic processing and improve intelligence of the graphic processing.

A person having ordinary skills in the art can realize that part or whole of the processes in the methods according to the above embodiments may be implemented by a computer program instructing relevant hardware. The program may be stored in a computer readable storage medium, and execute by at least one processor of the laptop computer, the tablet computer, the smart phone and PDA (personal digital assistant) and other terminal devices. When executed, the program may execute processes in the above-mentioned embodiments of methods. The storage medium may be a magnetic disk, an optical disk, a Read-Only Memory (ROM), a Random Access Memory (RAM), et al.

The foregoing descriptions are merely exemplary embodiments of the present invention, but not intended to limit the protection scope of the present disclosure. Any variation or replacement made by persons of ordinary skills in the art without departing from the spirit of the present disclosure shall fall within the protection scope of the present disclosure. Therefore, the scope of the present disclosure shall be subject to be appended claims.

What is claimed is:

1. A graphic processing method, comprising:
    analyzing a graphic processing template to generate a graphic configuration link when receiving the graphic processing template by a server;
    receiving at least one graphic information to be processed, and processing the at least one graphic information to generate a graphic file by the server according to the graphic configuration link, which comprises:
        receiving, by the server, the at least one graphic information to be processed which is uploaded by a client device;
        processing the at least one graphic information by the server according to the graphic configuration link, to generate at least one picture, wherein the at least one graphic information corresponds to at the least one picture, wherein the processing comprises:
            converting the at least one graphic information into at least one graphic object by the server,
            storing the at least one graphic object by the server using an array; and
            calling the at least one graphic object in the array for batch processing by the server according to the graphic configuration link to generate the at least one picture;
        combining the at least one picture by the server to generate the graphic file; and
        sending, by the server, the graphic file to a client device for displaying.

2. The graphic processing method of claim 1, wherein the step of analyzing a graphic processing template to generate a graphic configuration link when receiving the graphic processing template by a server, comprises:
    dividing the graphic processing template to obtain at least one template element when receiving the graphic processing template by the server, the template element comprising: an image, a text, a background or a subscript; wherein, the server digitizes each template element;
    configuring configuration parameters of each template element of the at least one template element; and
    combining the at least one template element to generate the graphic configuration link according to the configuration parameters of each template element of the at least one template, wherein, the graphic configuration link contains the configuration parameters of each template element of the at least one template.

3. The graphic processing method of claim 2, wherein the graphic information comprises: pictures and description information of the pictures.

4. The graphic processing method of claim 3, wherein the step of converting the at least one graphic information into at least one graphic object by the server, comprises:
    processing the at least one graphic information into an first XML file;
    transferring address of the first XML file to an iPicture system stool to obtain the first XML file by use of an AJAX combined with a PHP; and
    analyzing the first XML file by use of simple XML plug-in to convert the at least one graphic information of the first XML file into the at least one graphic object; and wherein the step of calling the at least one graphic object in the array for batch processing according to the graphic configuration link by the server to generate at least one picture, comprises:
    transferring the graphic configuration link to the iPicture system tool; and
    calling, by the iPicture system tool, the at least one graphic object in the array for batch processing to generate the at least one picture.

5. The graphic processing method of claim 2, the step of receiving at least one graphic information to be processed, and processing the at least one graphic information to generate a graphic file by the server according to the graphic configuration link, comprising:
    transmitting the graphic configuration link to the client device by the server to make the client device to process the at least one graphic information according to the graphic configuration line, to generate at least one picture and upload the at least one picture to the server; and
    combining the at least one picture uploaded by the client device to generate the graphic file by the server, which comprises:
        combining the at least on picture uploaded by the client device to generate a second XML file;
        storing the second XML file; and obtaining address of the second XML file after generating the second XML;

wherein, the graphic information comprises: pictures and description information of the pictures, and the graphic information corresponds to the pictures.

6. A server, comprising:
a template analysis module, configured to analyze a graphic processing template to generate a graphic configuration link when receiving the graphic processing template;
a graphic processing module, configured to receive at least one graphic information to be processed, and process the at least one graphic information to generate a graphic file according to the graphic configuration link; the graphic processing module comprising:
an information receiving unit, configured to receive the at least one graphic information to be processed which is uploaded by a client device;
a graphic processing unit, configured to process the at least one graphic information according to the graphic configuration link, to generate at least one picture, and comprising:
a converting unit, configured to convert the at least one graphic information into at least one graphic object, and the graphic information corresponding to the at least one picture;
a storage unit, configured to store the at least one graphic object using an array; and
a batch processing unit, configured to call the at least one graphic object in the array for batch processing according to the graphic configuration link to generate at least one picture;
a first combining unit, configured to combine the at least one picture to generate the graphic file; and
an output module, configured to send the graphic file to a client device for displaying.

7. The server of claim 6, wherein the template analysis module, comprises:
an element dividing unit, configured to divide the graphic processing template to obtain at least one template element when receiving the graphic processing template, and digitize each template element;
a parameter configuration unit, configured to configure configuration parameters of each template element of the at least one template element; and
a link generation unit, configured to combine the at least one template element to generate the graphic configuration link according to the configuration parameters of each template element of the at least one template, and the graphic configuration link containing the configuration parameters of each template element of the at least one template.

8. The server of claim 7, wherein the graphic information comprises: pictures and description information of the pictures.

9. The server of claim 8, wherein the converting unit is further configured:
to process the at least one graphic information into a first XML file;
to transfer address of the first XML file to an iPicture system stool to obtain the first XML file by use of an AJAX combined with a PHP; and
to analyze the first XML file by use of simple XML plug-in to convert the at least one graphic information of the first XML file into the at least one graphic object; and wherein the batch processing unit is further configured:

to transfer the graphic configuration link to the iPicture system tool; and
to call, by the iPicture system tool, the at least one graphic object in the array for batch processing to generate the at least one picture.

10. The server of claim 7, wherein the graphic processing module, comprises:
a link transmitting unit, configured to transmit the graphic configuration link to the client device by the server to make the client device to process the at least one graphic information according to the graphic configuration link, to generate at least one picture and upload the at least one picture to the server; and
a second combining unit, configured to combine the at least one picture uploaded by the client device to generate the graphic file, the second combining unit being further configured to:
combine the at least on picture uploaded by the client device to generate a second XML file;
store the second XML file; and
obtain address of the second XML file after generating the second XML; and
wherein, the graphic information comprises: pictures and description information of the pictures, and the graphic information corresponds to the pictures.

11. A graphic processing system, comprising: at least one client device, wherein the graphic processing system further comprises a server, the server comprises:
a template analysis module, configured to analyze a graphic processing template to generate a graphic configuration link when receiving the graphic processing template;
a graphic processing module, configured to receive at least one graphic information to be processed, and process the at least one graphic information to generate a graphic file according to the graphic configuration link; the graphic processing module comprising:
an information receiving unit, configured to receive the at least one graphic information to be processed which is uploaded by the client device;
a graphic processing unit, configured to process the at least one graphic information according to the graphic configuration link, to generate at least one picture, the graphic processing unit comprising:
a converting unit, configured to convert the at least one graphic information into at least one graphic object, and the graphic information corresponding to the at least one picture;
a storage unit, configured to store the at least one graphic object using an array; and
a batch processing unit, configured to call the at least one graphic object in the array for batch processing according to the graphic configuration link to generate at least one picture; and
a first combining unit, configured to combine the at least one picture to generate the graphic file; and
an output module, configured to send the graphic file to a client device for displaying.

12. The graphic processing system of claim 11, wherein the template analysis module, comprises:
an element dividing unit, configured to divide the graphic processing template to obtain at least one template element when receiving the graphic processing template, and to digitize each template element;
a parameter configuration unit, configured to configure configuration parameters of each template element of the at least one template element; and a link generation unit, configured to combine the at least one template element to generate the graphic configuration link according to the configuration parameters of each template element of the at least one template, and the graphic configuration link containing the configuration parameters of each template element of the at least one template.

13. The graphic processing system of claim 12, wherein the graphic information comprises: pictures and description information of the pictures.

14. The graphic processing system of claim 13, wherein the converting unit is further configured to:
process the at least one graphic information into an first XML file;
transfer address of the first XML file to an iPicture system stool to obtain the first XML file by use of an AJAX combined with a PHP; and
analyze the first XML file by use of simple XML plug-in to convert the at least one graphic information of the first XML file into the at least one graphic object; and
wherein the batch processing unit is further configured to:
transfer the graphic configuration link to the iPicture system tool; and
call, by the iPicture system tool, the at least one graphic object in the array for batch processing to generate the at least one picture.

15. The graphic processing system of claim 12, wherein the graphic processing module, comprises:
a link transmitting unit, configured to transmit the graphic configuration link to the client device by the server to make the client device to process the at least one graphic information according to the graphic configuration link, to generate at least one picture and upload the at least one picture to the server; and
a second combining unit, configured to combine the at least one picture uploaded by the client device to generate the graphic file, the second combining unit being configured to:
combine the at least on picture uploaded by the client device to generate a second XML file;
store the second XML file; and
obtain an address of the second XML file after generating the second XML; and
wherein, the graphic information comprises: pictures and description information of the pictures, and the graphic information corresponds to the pictures.

* * * * *